(12) United States Patent
Schneider et al.

(10) Patent No.: US 10,489,150 B2
(45) Date of Patent: Nov. 26, 2019

(54) SOFTWARE DEPENDENCY SHADING

(71) Applicant: Netflix, Inc., Los Gatos, CA (US)

(72) Inventors: Jonathan Schneider, San Jose, CA (US); Daniel Thomas, Campbell, CA (US); Robert Spieldenner, San Jose, CA (US); Michael McGarr, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 193 days.

(21) Appl. No.: 15/081,667

(22) Filed: Mar. 25, 2016

(65) Prior Publication Data
US 2016/0328230 A1 Nov. 10, 2016

Related U.S. Application Data

(60) Provisional application No. 62/157,401, filed on May 5, 2015.

(51) Int. Cl.
*G06F 8/75* (2018.01)
*G06F 8/54* (2018.01)
*G06F 8/71* (2018.01)
*G06F 8/72* (2018.01)
*G06F 8/30* (2018.01)

(52) U.S. Cl.
CPC ............ *G06F 8/75* (2013.01); *G06F 8/30* (2013.01); *G06F 8/54* (2013.01); *G06F 8/71* (2013.01); *G06F 8/72* (2013.01)

(58) Field of Classification Search
CPC ...... G06F 8/75; G06F 8/30; G06F 8/54; G06F 8/71; G06F 8/72
See application file for complete search history.

(56) References Cited

U.S. PATENT DOCUMENTS

| | | |
|---|---|---|
| 6,804,682 B1 | 10/2004 | Kemper et al. |
| 8,813,031 B2 | 8/2014 | Agarwal |
| 2002/0100017 A1 | 7/2002 | Grier et al. |

(Continued)

OTHER PUBLICATIONS

International Search Report Application No. PCT/US2016/030760, dated Jun. 28, 2016, 14 pages.

(Continued)

*Primary Examiner* — Viva Miller
(74) *Attorney, Agent, or Firm* — Artegis Law Group, LLP (57) ABSTRACT

In one embodiment of the present invention, a shading engine enables multiple versions of dependencies to coexist in an executable software application. During the software build process, the shading engine dynamically renames transitive dependencies of the software application to disambiguated names. The shading engine performs this renaming at both the library and class level. Notably, the shading engine does not rename the first-order dependencies of the software application. Consequently, the code of the software application and interfaces between the software application and the first-order library dependencies of the software application are not modified. Notably, the shading engine efficiently and accurately shades the transitive dependencies without manual intervention. By contrast, primarily manually-based conventional approaches to dependency management are time consuming and susceptible to errors.

20 Claims, 4 Drawing Sheets

(56) References Cited

U.S. PATENT DOCUMENTS

| | | | |
|---|---|---|---|
| 2003/0115548 A1* | 6/2003 | Melgar | G06F 8/30 |
| | | | 715/234 |
| 2009/0064100 A1 | 3/2009 | Schiefer | |
| 2009/0232304 A1* | 9/2009 | King | G06F 21/125 |
| | | | 380/210 |
| 2011/0302565 A1* | 12/2011 | Ferris | G06F 8/54 |
| | | | 717/163 |
| 2014/0310693 A1* | 10/2014 | Elston | G06F 11/3688 |
| | | | 717/129 |
| 2014/0351802 A1* | 11/2014 | Elias | G06F 8/70 |
| | | | 717/166 |
| 2015/0277941 A1* | 10/2015 | Dobson | G06F 9/44521 |
| | | | 717/164 |
| 2016/0378440 A1* | 12/2016 | Magidson | G06F 8/71 |
| | | | 717/140 |

OTHER PUBLICATIONS

Adrian Shum: "What is the maven-shade-plugin used for, and why would you want to relocate java packages?—Stack Overflow", stackoverflow.com, Oct. 11, 2014 (Oct. 11, 2014) XP055280354, Retrieved from the Internet: URL:http ://web.archive.org/web/20141011061308/http://stackoverflow.com/questions/13620281/what-is-the-maven-shade-plugin-used for-and-why-would-you-want-to-relocate-java [retrieved on Jun. 14, 2016] p. 1-p. 2.

* cited by examiner

SOFTWARE DEPENDENCY SHADING

CROSS-REFERENCE TO RELATED APPLICATIONS

This application claims benefit of the United States Provisional patent application having Ser. No. 62/157,401 and filed on May 15, 2015. The subject matter of this related application is hereby incorporated herein by reference.

BACKGROUND OF THE INVENTION

Field of the Invention

Embodiments of the present invention relate generally to computer software and, more specifically, to software dependency shading.

Description of the Related Art

The process of generating an executable software application based on application source code is referred to as a software "build" process. Such a process typically involves compiling application source code to generate binary object files and then linking the binary object files with binary "libraries" to generate the executable software application. The libraries implemented in a build process usually include previously compiled code that may be used by any number of software applications as well as other libraries. Oftentimes, multiple versions of a particular library exist, and different software applications and libraries may use different versions of that library. Accordingly, version-specific dependencies can exist between the binary files required to generate an executable software application.

However, in many common programming languages, only one version of any binary object may be represented in the executable software application at any given time. For example, suppose that a video recommendation application depends on a first version of a graphical user interface (GUI) library and a second version of a sorting library. Further, suppose that the first version of the GUI library depends on a first version of the sorting library. Finally, suppose that the correct behavior of the software application requires the second version instead of the first version of the sorting library, and the correct behavior of the GUI library requires the first version instead of the second version of the sorting library. In such a scenario, the build engine would select only one version of the sorting library to resolve the dependency conflict. Consequently, when the video recommendation application executes, the video recommendation application may crash or behave incorrectly.

For example, suppose that the build engine includes the second version of the sorting library in the executable video recommendation application. Further, suppose that the first version of the sorting library contains a software routine "foo", and the second version of the library removes this routine. Finally, suppose that the correct operation of the GUI library depends on code contained in the first version of the sorting library. At runtime, because of version conflict resolution, only the second version of the sorting library is present. As the video recommendation application executes, instructions associated with the GUI library attempt to access the software routine foo. Because the software routine foo has been removed in the second version of the sorting library, the executable video recommendation application terminates unexpectedly.

In an attempt to avoid such scenarios, software developers may attempt to eliminate dependency conflicts prior to executing the software build. For example, in a "dependency locking" approach, software developers endeavor to select, maintain, and enforce a specific set of versions of all libraries that are dependencies of the software application. The resulting software application code and library code is then tested using the locked set of versions of the libraries. However, dependency locking is primarily a manually-based process that is time consuming, susceptible to errors, and undesirably reliant on complete compliance with the locked set of versions of libraries. For example, if developers do not comply (test, etc.) with the locked set of versions of libraries, then dependency conflicts could still exist. Further, updating a locked set of versions of libraries to implement bug fixes or incorporate new software features usually requires extensive coordination and testing and, as a result, can cause substantial delays when trying to fix or upgrade the executable software application.

As the foregoing illustrates, what is needed in the art are more effective techniques for reducing dependency conflicts when generating executable software applications.

SUMMARY OF THE INVENTION

One embodiment of the present invention sets forth a computer-implemented method for software dependency shading. The method includes determining that a first library is a dependency of a second library; retrieving the first library from a binary software repository stored in a memory; renaming a first set of one or more classes included in the first library to generate a first disambiguated library that includes a second set of one or more disambiguated classes; searching the second library, via a processor, for references to the first set of one or more classes; and replacing the references to the first set of one or more classes with references to the second set of one or more disambiguated classes to generate a second disambiguated library.

One advantage of the disclosed techniques is that a build system may implement a shading engine that serves as a reverse proxy for a binary repository manager. As a software build tool generates an executable software application, the shading engine dynamically renames transitive dependencies of the software application to disambiguate between different versions of the transitive dependencies. Such a just-in-time shading process enables the software build tool to include multiple versions of the transitive dependencies in the executable software application without manual intervention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
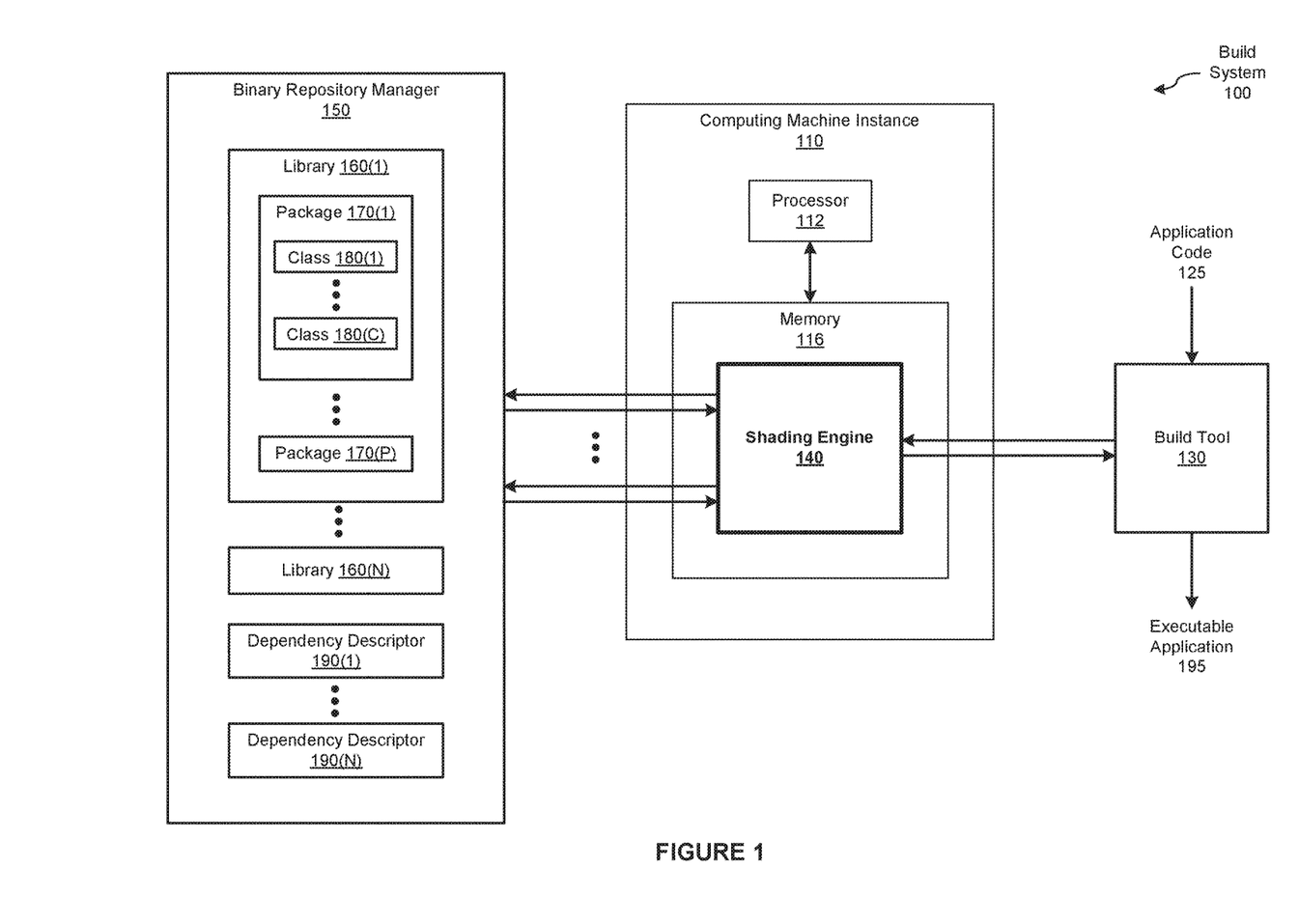
FIG. 1 is a conceptual illustration of a build system configured to implement one or more aspects of the present invention.

FIG. 1 is a conceptual illustration of a build system 100 configured to implement one or more aspects of the present invention. As shown, the build system 100 includes, without limitation, a build tool 130, a binary repository manager 150, and a computing machine instance 110. The build system 100 provides an infrastructure for a software build process that generates an executable application 195 based on an application code 125. As a general matter, the application code 125 may include any number of discrete files that include source code that specify the functionality of the executable application 195.

The build tool 130 manages the software build process. More specifically, the build tool 130 compiles the application code 125 to generate binary object files and then links the binary object files with previously compiled binary object files to generate the executable application 195. The binary repository manager 150 stores previously compiled binary object files and supplies the previously compiled binary object files via a client-server architecture. Generally, in client-server architectures, clients request services and, in response, servers provide services. More specifically, upon receiving a request from a client to provide a previously compiled binary object file stored within the binary repository manager 150, the binary repository manager 150 returns the requested binary object file.

As shown, the binary repository manager 150 includes, without limitation, any number of libraries 160 and associated dependency descriptors 190. For explanatory purposes, multiple instances of like objects are denoted with reference numbers identifying the object and parenthetical numbers identifying the instance where needed. Each of the libraries 160 implements a hierarchical organization structure that includes previously-compiled, reusable sets of instructions. Such "software routines" are designed for re-use by the application codes 125 associated with any number of different executable applications 195. As also shown, each of the libraries 160 includes, without limitation, any number of packages 170. Similarly, each of the packages 170 includes, without limitation, any number of classes 180. Finally, each of the classes 180 includes, without limitation, any number of software routines.

Notably, the software code 125 typically implements a complementary hierarchical organization. For example, the software code 195 may include any number of the classes 180. In alternate embodiments, the binary repository manager 150 may store any type of binary object files that include any number and type of software routines organized in any technically feasible fashion. Further, the software code 125 may specify any number and type of software objects and routines organized in any technically feasible fashion.

The library 160(i) is associated with the dependency descriptor 190(i). Accordingly, the number of the libraries 160 included in the binary repository manager 150 matches the number of the dependency descriptors included in the binary repository manager 150. The dependency descriptor 190(i) specifies the other libraries 160 with which the library 160(i) directly interfaces. Such first-order dependencies may be associated with any level in the hierarchical organization of the libraries. For example, if the class 180(x) included in the software code 195 depends on a class 180(y) included in the library 160(i), then the class 180(y) is a class dependency of the class 180(x), and the library 160(i) is a library dependency of the software code 195. By contrast, a transitive dependency is an indirect dependency. For example, if the library 160(i) is a first-order dependency of the software code 195 and the library 160(j) is a first-order dependency of the library 160(i), then the library 160(j) is a transitive dependency of the software code 195. A transitive dependency involves a minimum of three entities.

At any given point in time, any number of the libraries 160 may specify the same library name but different versions. For example, the libraries 160 could include a "lib A version 2," a "libA version 3," and a "libA version 4." For explanatory purposes, the references to different versions of the libraries 160 with the same name include parenthetical numbers where needed. For example, the library 160(x) and the library 160(y) differ from each other in at least one of name and version. The interface and functionality of each version of the libraries 160 with the same name may differ and, oftentimes, the software code 195 and the other libraries 160 may implement different versions of the libraries 160 with the same name. Accordingly, the dependencies between the application code 125 and the libraries 160 as well as between the libraries 160 are version-specific in addition to name-specific.

To enable the build system 100 to effectively manage multiple versions of the libraries 160 with the same name, the binary repository manager 160 stores each version of the libraries 160 with the same name as independent libraries 160. Each version of the library 160 with the same name is associated with a different dependency descriptor 190. Further, each of the dependency descriptors 190 may specify different versions of the other libraries 160 upon which the library 160 associated with the dependency descriptor 190 depends.

However, in many common programming languages, only one version of any binary object with the same name may be represented in the executable application 195 at any given time. More precisely, if the application code 195 is written in a programming language that implements a sequential dependency list, then only one version of any binary object with the same name may be represented in the executable application 195 at any given time. For example, suppose that the first-level dependencies of the application code 125 "appA" include the libraries 160(1) "libA version 1" and 160(2) "libB version 1." Further suppose that the first-level dependencies of the library 160(1) include the library 160(3) "libB version 2." Because library 160(2) and library 160(3) share the same name, during linking, a conventional build system includes either the library 160(2) or the library 160(3), but not both of the libraries 160(2) and 160(3). If the conventional build system includes the library 160(3) instead of the library 160(2), then the executable application 195 may crash or behave incorrectly when the instructions specified by the application code 125 execute. If the conventional build system includes the library 160(2) instead of the library 160(3), then the executable application 195 may crash or behave incorrectly when the instructions specified by the library 160(1) execute.

Shading Engine

In operation, the shading engine 140 serves as a reverse proxy for the binary repository manager 150. More specifically, the shading engine 140 retrieves the libraries 160 stored in the binary repository manager 150 on behalf of the build tool 130. The build system 100 may be configured to implement the shading engine 140 as a reverse proxy in any technically feasible fashion. For example, an administrator of the build system 130 may configure the build tool 130 to route requests for the libraries 160 to the shading engine 140 instead of the binary repository manager 150. Further, the administrator may configure the shading engine 140 to respond to requests for the libraries 160 using the binary repository manager 150. Subsequently, software engineers that execute the build tool 130 need not be aware of the existence of the shading engine 130 and the functionality implemented within the build tool 130 need not change.

To eliminate run-time errors attributable to such dependency conflicts, the software build system 100 includes a shading engine 140 that dynamically renames the transitive dependencies of the software code 125. As shown, the shading engine 140 is stored in a memory 116 included in the computing machine instance 110. In operation, a processor 112 included in the computing machine instance 110 executes the shading engine 140. In alternate embodiments, the computing machine instance 110 may include any amount and type of the memory 118 and any number of the processors 112. Further, any number and type of computing machine instances 110 may implement the shading engine 140 in any technically feasible fashion. In some alternate embodiments, the computing machine instance 110 may be replaced with any type of cloud computing environment or distributed computing environment.

Upon receiving a request for the library 160, the shading engine 140 retrieves the library 160 and the associated dependency descriptor 190 from the binary repository manager 150. The shading engine 140 identifies any transitive dependencies of the application code 195 that are included in the retrieved library 160. The shading engine 140 then modifies the retrieved library 160 and the associated dependency descriptor 190 to disambiguate any transitive dependencies of the application code 195 from other dependencies of the application code 195. The shading engine 140 may disambiguate the transitive dependencies of the application code 195 in any technically feasible fashion. For example, in some embodiments, the shading engine 140 may rename each of the transitive dependencies of the application code 195 included in the retrieved library 160 and the dependency descriptor 190 based on the specified version. Further, if the retrieved library 160 is included in the transitive dependencies of the application code 125, then the shading engine 140 may rename the retrieved library 160 based on the specified version.

Such a "shading" process isolates dependencies from conflicting dependencies and disambiguates the library 160 and the associated dependency descriptor 190 from other versions of the library 160. As referred to herein, the terms "shading" and "disambiguation" refer to a process of ensuring that the name of a particular object differs from the names of other like objects. For example, if the retrieved library 160(1) is "libA version5," and is a transitive dependency of the software code 125, then the shading engine 150 could rename the retrieved library 160 to "libA_v5." The shading engine 140 then returns the disambiguated library 160 and the associated dependency descriptor 190 to the build tool 130.

Notably, the shading engine 140 does not rename any of the direct dependencies of the application code 125 and, consequently, the application code 125 and the associated dependency descriptor 190 are not changed during the software build process. For example, if the library 160(5) "libA version 6" is a direct dependency of the software code 125, then the shading engine 140 renames all the other libraries 160 with the name "libA" but does not rename the library 160(5).

To correctly identify and modify all the transitive dependencies of the application code 125 that are included in the retrieved library 160, the shading engine 140 preemptively processes all the libraries 160 that are dependencies of the retrieved library 160. In particular, for each of the first-level dependencies specified in the retrieved dependency descriptor 190, the shading engine 140 retrieves the specified version of the specified library 160 and then recursively traverses the dependencies specified in the newly retrieved dependency descriptor 190. In this manner, the shading engine 140 traverses the dependency tree associated with the application code 125 depth-first. Accordingly, as depicted in FIG. 1, in response to a single request received from the build tool 130, the shading engine 140 may retrieve multiple libraries 160 from the binary repository manager 140.

The shading engine 160 traverses the dependencies until the retrieved dependency descriptor 190 specifies no libraries 160 or the shading engine 140 has previously processed all the libraries 160 specified in the retrieved dependency descriptor 190. The shading engine 140 then shades the retrieved library 160 and reverses the depth-first traversal, shading each of the previously retrieved libraries 160 after shading the dependencies of the library 160.

As a general matter, the build tool 130 requests each of the libraries 160 that are included in the dependencies of the application code 125 based on the dependency descriptors 190. In response to each request, the build tool 130 returns the disambiguated requested library 160 and the disambiguated dependency descriptor 190. The disambiguated dependency descriptor 190 specifies the disambiguated libraries 160 that are first-level dependencies of the disambiguated requested library 160. Consequently, as part of processing the disambiguated dependency descriptor 190, the build tool 130 may request any combination of the disambiguated libraries 160 and the libraries 160 that the shading engine 140 has not yet shaded.

To optimize the software build process, the shading engine 140 may be configured to store previously disambiguated libraries 160 and the associated dependency descriptors 190. Upon receiving a request for a disambiguated library 160, the shading engine 140 retrieves and supplies the stored disambiguated library 160 and the associated dependency descriptor 190 and does not perform additional shading operations. The shading engine 140 may store the disambiguated libraries 160 in any technically feasible fashion.

The build system 100 may implement any number and type of interactions and/or conventions to selectively invoke shading operations and/or dynamically identify the dependencies of the application code 125 during the software build process. For example, in some embodiments, the build system 100 may implement a feature that prevents the shading engine 140 from performing shading operations for specific dependencies of the application code 125.

In other embodiments, the build tool 130 may append "_module" to indicate a request for a shaded version of a particular library 160 that is a first-order dependency of the application code 125. In such embodiments, to retrieve a shaded version of the library 160(*i*) "foo version 1.10," the build tool 130 could transmit the command "get library foo_module:1.10" to the shading engine 140. As part of shading the library 160(*i*) "foo version 1.10," the shading engine 140 could rename a transitive dependency of the application code 125 to "fooDependency_GENERATEDHASH:1.6.

After the shading engine 140 returns the shaded library 160(*i*) "foo version 1.10" and the associated dependency descriptor 190(*i*), the build tool 130 may request the transitive dependencies of the application code 125 that are specified in the dependency descriptor 190(*i*). Because the build tool 130 has preemptively shaded and renamed these transitive dependencies, the shading engine 140 does not append "_module," and the shading engine 140 retrieves the previously shaded libraries 160 without performing additional shading operations. For example, based on the dependency descriptor 190(*i*), the shading engine 140 would subsequently request the library 160(*j*) "fooDependency_GENERATEDHASH:1.6."

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the techniques described herein may be applied to any programming language that implements a sequential dependency list to enable multiple versions of object files with the same name to co-exist in executable applications. Further, the functionality of the shading engine 140 may be implemented independently of the build tool 130 and/or the binary repository manager 150.

Figure 2:
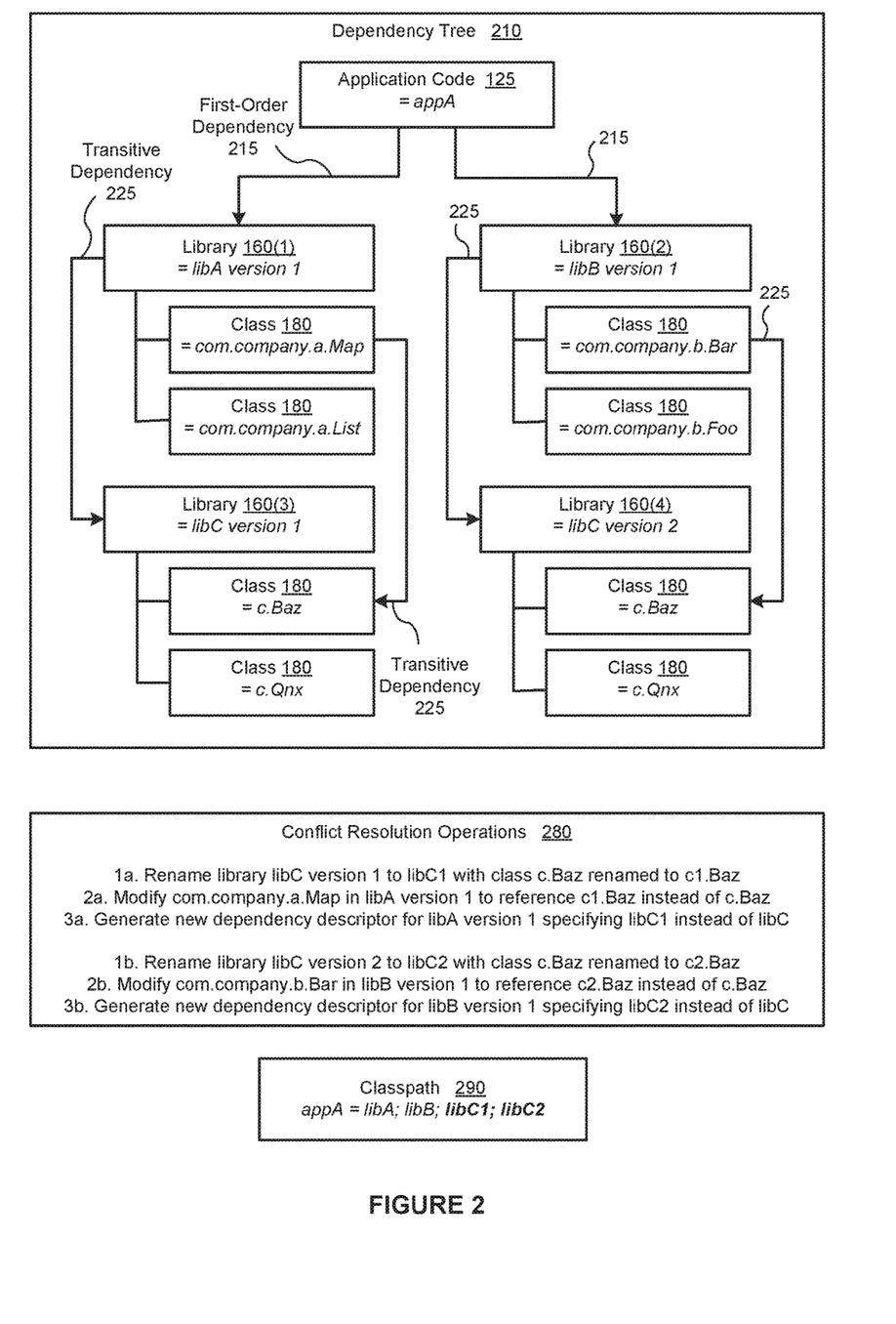
FIG. 2 is an example of how the shading engine of FIG. 1 shades transitive dependencies of application code, according to various embodiments of the present invention.

FIG. 2 is an example of how the shading engine 140 of FIG. 1 shades transitive dependencies 225 of the application code 125, according to various embodiments of the present invention. For explanatory purposes only, a dependency tree 210 depicts the classes 180 and the libraries 160 included in the dependencies of the application code 125. Note that the dependency tree 210 is a conceptualization of the dependencies of the application code 125 that the shading engine 140 identifies and evaluates during the software build process. The shading engine 140 does not construct the dependency tree 210, but virtually traverses the dependency tree 210 based on the dependency descriptors 190. Although not shown in FIG. 2, each of the libraries 160 includes a single package 170, and the name of the package 170 matches the name of the library 160.

In various embodiments, each of the libraries 160 may include any number of packages 170 and the techniques described herein may be modified and applied to each of the packages 170. In alternate embodiments, the dependency tree 210 may reflect any organization of the instructions included in the libraries 160 and the techniques described herein may be modified accordingly. As a general matter, many modifications and variations will be apparent to those of ordinary skill in the art without departing from the scope and spirit of the described embodiments.

As shown, the dependency tree 130 includes, without limitation, first-order dependencies 215 of the application code 125 "appA" and the transitive dependencies 225 of the application code 125. The first-order dependencies 215 of the application code 125 include the library 160(1) "libA version 1" and the library 160(2) "libB version 1." The library 160(1) depends on the library 160(3) "libC version 1." More specifically, the class 180 "com.company.a.Map" included in the library 160(1) depends on the class 180 "c.Baz" included in the library 160(3). By contrast, the library 160(2) depends on the library 160(4) "libC (version 2)." More specifically, the class 180 "com.company.b.Bar" included in the library 160(2) depends on the class 180 "c.Baz" included in the library 160(3). Consequently, the transitive dependencies 225 of the application code 125 include two versions of "libC"—the libraries 160(3) and 160(4)—and the two versions of "c.Baz" that are included in the libraries 160(3) and 160(4).

As part of the software build process previously described herein, the shading engine 140 performs conflict resolution operations 280. For explanatory purposes, the build tool 130 first requests "libA version 1." As part of responding to the request, the shading engine 140 performs a sequence of shading operations that are depicted as the conflict resolution operations 1*a*, 2*a*, and 3*a*. First, the shading engine 140 renames the library 160(3) "libC version 1" to "libC1," and renames the class 180 "c.Baz" included in the library 160(3) to "c1.Baz." The shading engine 140 may rename the classes 180 in any technically feasible fashion.

For example, in some embodiments, the shading engine 140 may "package relocate" the classes 180 based on the version of the library 160 that includes the classes 180. Such a package relocation operation involves renaming the package that includes the classes 180 to include the version. As referred to herein, the "name" of each class 180 is the fully qualified name that includes the package name. Consequently, the names of such packaged relocated classes 180 also include the version.

Subsequently, the shading engine 140 modifies the library 160(1) "lib A version 1" to reference "c1.Baz" instead of "c.Baz." More specifically, the shading engine 140 manipulates the bytecode of the class 180 "com.company.a.Map" to refer to "c1.Baz" instead of "c.Baz." Finally, the shading engine 140 modifies the dependency descriptor 190(1) associated with the library 160(1) "libA version 1" to specify that library 160(1) is dependent on "libC1" instead of "libC." The shading engine 140 then returns the disambiguated library 160(1) and the disambiguated dependency descriptor 190(1) to the build tool 130.

After the build tool 130 requests and receives the disambiguated library 160(3), the build tool 130 requests the library 160(2) "libB version 1." As part of responding to the request, the shading engine 140 performs a sequence of shading operations that are depicted as the conflict resolution operations 1*b*, 2*b*, and 3*b*. First, the shading engine 140 renames the library 160(4) "libC version 2" to "libC2," and renames the class 180 "c.Baz" included in the library 160(4) to "c2.Baz." Second, the shading engine 140 modifies the library 160(2) "lib B version 1" to reference "c2.Baz" instead of "c.Baz." More specifically, the shading engine 140 manipulates the bytecode of the class 180 "com.company.b.Bar" to refer to "c2.Baz" instead of "c.Baz." Finally, the shading engine 140 modifies the dependency descriptor 190(2) associated with the library 160(2) "libB version 1" to specify that library 160(2) is dependent on "libC2" instead of "libC."

As shown, after the shading engine 140 performs the conflict resolution operations 280, a classpath 290 associated with the application code 125 "myApp" is "libA; libB; libC1; libC2. The classpath 290 is a sequential dependency list that specifies libraries 160 that the build tool 130 links with the application code 125 to generate the executable application 195. Since one version of the class 180 "c.Baz" is included in the library 160(3) "libC1" and the other version of the class 180 "c.Baz" is included in the library 160(4) "libC2," there is no conflict between the two versions of the class 180 "cBaz." Further, all the references to the class 180 "cBaz" included in the executable application 195 refer to the appropriate version of the class 180 "cBaz." Accordingly, the executable application 195 does not include dependency conflicts that may cause run-time errors.

In alternate embodiment, the dependency tree 210 may include any number of different dependencies. For example, if the application code 125 is relatively complex, then the dependency tree 210 may include hundreds or thousands of different dependencies. Further, the relationships between the dependencies may be complicated. For example, the first-order dependencies 215 of the application code 125 "complicatedApp" could include the library 160(1) and the library 160(2), and the dependencies of the library 160(2) could include the library 160(1). In such a scenario, the shading engine 140 would not rename the library 160(1).

To ensure that the executable application 194 does not include any dependency conflicts, the shading engine 140 may implement any number of algorithms that resolve convoluted dependency conflicts "just-in-time" (i.e., during the build process). In various embodiments, the shading engine 140 may implement such modifications without departing from the scope and spirit of the described embodiments. One such convoluted dependency conflict is the presence of classes that are transitive dependencies 225 of the application code 125 in the seams between the application code 125 and libraries included in the first-order dependencies 215 of the application code. 125.

Figure 3:
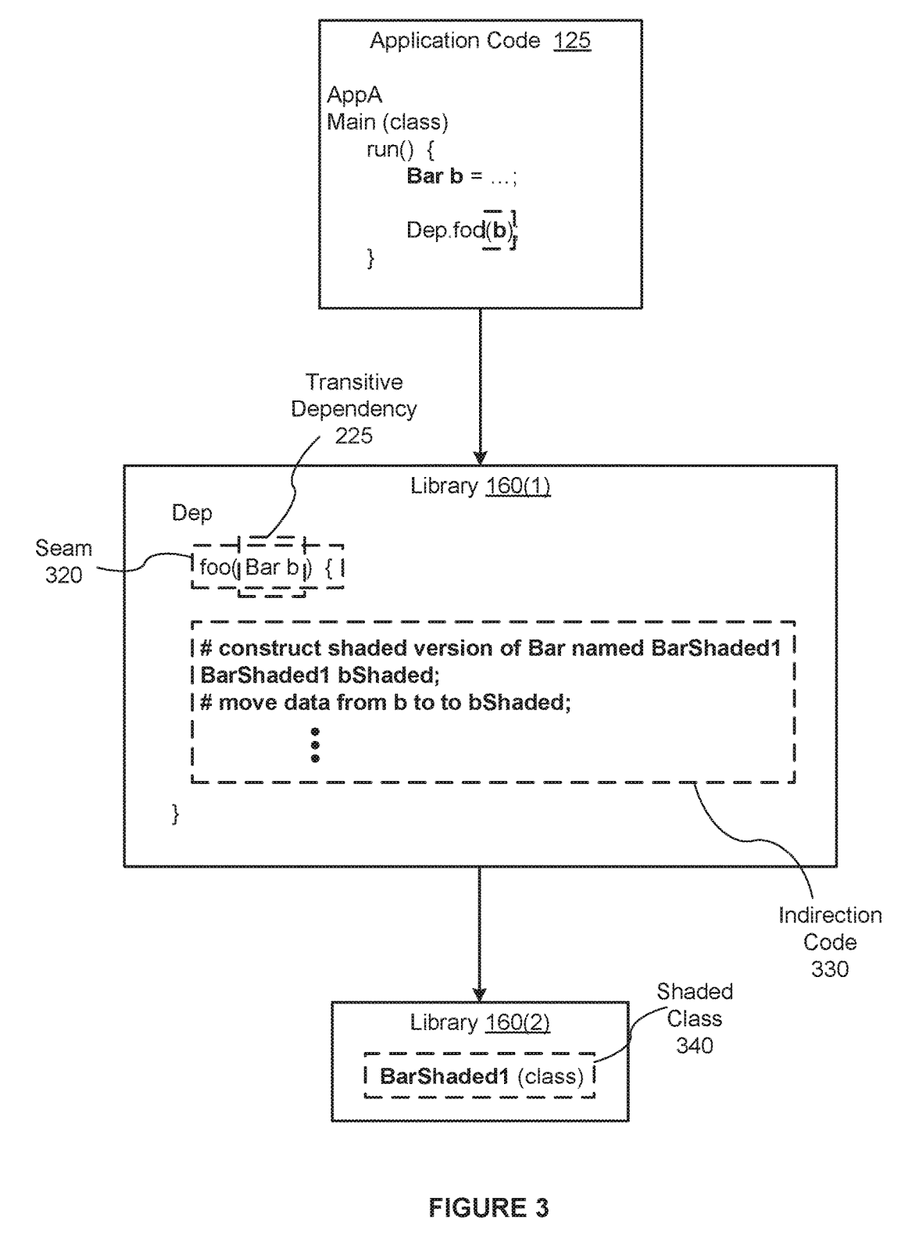
FIG. 3 is an example of how the shading engine of FIG. 1 indirectly shades a transitive dependency that appears in a seam between the application code and a library, according to various embodiments of the present invention.

FIG. 3 is an example of how the shading engine 140 of FIG. 1 indirectly shades the transitive dependency 225 that appears in a seam 320 between the application code 125 and the library 160(1), according to various embodiments of the present invention. For explanatory purposes, as shown, the application code 125 depends directly on the library 160(1) "Dep" and the library 160(1) depends directly on the library 160(2). Accordingly, the library 160(1) is included in the first-order dependencies 215 of the application code 125. By contrast, the library 160(2) is included in the transitive dependencies 225 of the application code 125 and the first-order dependencies 215 of the library 160(1). Note that the application code 125 and the seam 320 are not generated by the shading engine 140, but are depicted for explanatory purposes. By contrast, as described in more detail below, the shading engine 140 generates indirection code 330 and a shaded class 340.

The seams 320 include the signatures of software routines, also referred to as methods, that are specified by the first-order dependencies 215 of the application code 125 and exposed to the application code 125. The application code 125 may include "calls" to the seams 320. Because the shading engine 140 does not modify the first-order dependencies of the application code 125, the shading engine 140 does not modify the seams 320 between the application code 125 and the first-order dependencies 125 of the application code 125.

However, one or more transitive dependencies 225 of the application code 125 may appear in any of the seams 320 between the application code 125 and the first-order dependency 125 of the application code 125. Further, the version of the transitive dependency 225 that is included in the call to the seam 320 may differ from the version of the transitive dependency 225 that is required for the correct operation of the software routine. In such a scenario, the shading engine 140 executes indirect shading operations to ensure that any dependency conflicts are correctly resolved without modifying the application code 125.

For instance, as shown, the application code 125 includes an instance of the class 180 "Bar" in a call to the seam 320 "Dep.foo(Bar b)" that is specified in the library 160(1). However, the class 180 "Bar" is included in the transitive dependencies 225 of the application code 125. More specifically, the class 180 "Bar" is specified in the library 160(2) and the library 160(1) refers to the class 180 "Bar" that is included in the library 160(2). To enable multiple versions of the class 180 "Bar" to co-exist in the executable application 195, the shading engine 140 renames the class 180 "Bar" included in the library 160(2) to create the shaded class 340 "BarShaded1."

Further, to preserve the integrity of the seam 320 between the software application 125 and the library 160(1), the shading engine 140 injects the indirection code 330 into the code associated with the seam 320 "Dep.foo(Bar b) in the library 160(1). As shown, the indirection code 330 includes instructions that create an instance of the shaded class 340 "BarShaded1." The indirection code 330 further includes instructions that copy data from the instance of the class 180 "Bar" that the library 160(1) receives as part of the call to the instance of the shaded class 430. In this fashion, the shading engine 140 resolves the dependency conflict associated with the presence of the transitive dependency 225 "Bar" in the seam 340 "Dep.foo(Bar b)" without modifying the software application 125.

The shading engine 140 may identify the transitive dependencies 225 of the application code 125 that appear in the seams 320 between the application code 125 and the libraries 160 in any technically feasible fashion. For example, in some embodiments, the application code 125 is written in the Java programming language. In such embodiments, as the shading engine 140 is processing the library 160(1), the shading engine 160 may evaluate any references to the classes 180 that are included in the seams 320. If such a referenced class 180 is included in neither the Java standard library nor the library 160(1), then the shading engine 140 determines that the class 180 is a transitive dependency of the application code 125.

Figure 4:
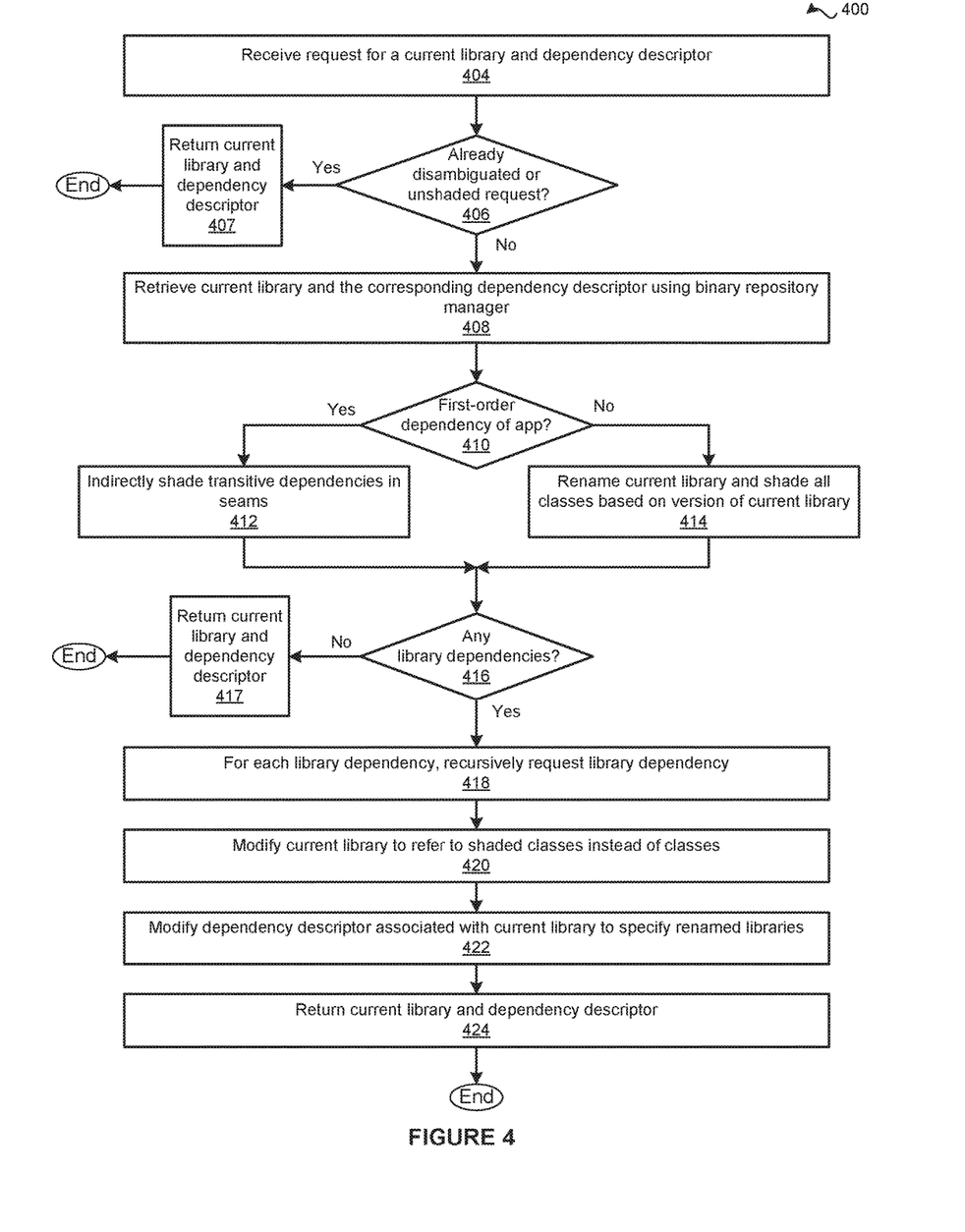
FIG. 4 is a flow diagram of method steps for reducing dependencies when generating executable application code, according to various embodiments of the present invention.

FIG. 4 is a flow diagram of method steps for shading transitive dependencies of a software application, according to various embodiments of the present invention. FIG. 4 is a flow diagram of method steps for reducing dependencies when generating executable application code, according to various embodiments of the present invention. Although the method steps are described with reference to the systems of FIGS. 1-3, persons skilled in the art will understand that any system configured to implement the method steps, in any order, falls within the scope of the present invention. For explanatory purposes, the context of FIG. 4 is that the build tool 130 is configured to invoke the shading engine 140 as a reverse proxy for the binary repository manager 150. The build tool 130 may be configured in any technically feasible fashion. For example, a build system administrator could configure the build tool 130 prior to deploying the build tool 130 to software engineers.

As shown, a method 400 begins at step 404, where the shading engine 140 receives a request for a current library **160(*i*) and the associated dependency descriptor 190(*i*). Note that the current library 160(*i*) is distinguished by both a name and a version. The shading engine 140 may receive the request from the build tool 130 or recursively from the shading engine 140. For example, referring to FIG. 2, the shading engine 140 could receive a request for the library 160(1) from the build tool 130. However, the library 160(3) is a dependency of the library 160(1) and one of the transitive dependencies 225 of the application code 125**.

Consequently, as part of processing the request for the library 160(1), the shading engine 140 recursively requests the library 160(3) from the shading engine 140.

At step 406, the shading engine 140 determines whether the current library 160(*i*) is already disambiguated. More specifically, the shading engine 140 determines whether the shading engine 140 has previously shaded the transitive dependencies 225 of the application code 125 and/or references to such transitive dependencies 225 that are included in the current library 160(*i*). For example, suppose that the current library 160(*i*) is included multiple times in the dependency tree 210 associated with the application code 125. In such a scenario, the shading engine 140 would receive multiple requests for the current library 160(*i*). The shading engine 140 would disambiguate the current library 160(*i*) in response to the first request. Subsequently, the shading engine 140 would determine that the current library 160(*i*) is already disambiguated.

If, at step 406, the shading engine 140 determines that the current library 160(*i*) is already disambiguated or that the request is a user request for an unshaded dependency, then the method 400 proceeds to step 407. At step 407, the shading engine 140 returns the current library 160(*i*) and the associated dependency descriptor 190(*i*) to the requester. In this fashion, the shading engine 140 does not repeatedly perform shading operations for the current version of the current library 160(*i*). The requester may be either the build tool 130 or the shading engine 140. Advantageously, because the dependency descriptor 190(*i*) references the differentiated libraries 160, the build tool 130 is automatically configured to proceed with the software build using the disambiguated libraries 160. The method 400 then terminates.

If, however, at step 406, the shading engine 140 determines that the current library 160(*i*) is not already disambiguated and that the request is not a user request for an unshaded dependency, then the method 400 proceeds directly to step 408. At step 408, the shading engine 140 retrieves the current library 160(*i*) and the associated dependency descriptor 190(*i*) from the binary repository manager 150. At step 410, the shading engine 140 determines whether the current library 160(*i*) is included in the first-order dependencies 215 of the application code 125 or included in the transitive dependencies 225 of the application code 125. If, at step 410, the shading engine 140 determines that the current library 160(*i*) is included in the first-order dependencies 215 of the application code 125, then the method 400 proceeds to step 412.

At step 412, the shading engine 140 indirectly shades the transitive dependencies 225 of the application code 125 that appear in the seams 320 between the application code 125 and the current library 160(*i*). More specifically, for each such transitive dependency 225, the shading engine 140 injects the indirection code 330 into the code associated with the seam 320. The indirection code 330 includes instructions that create an instance of the shaded class 340 corresponding to the transitive dependency 225 and then copy data from an instance of the transitive dependency 225 to the instance of the shaded class 340. The shading engine 140 may identify the name of the shaded class 340 in any technically feasible fashion. For example, in some embodiments, the shading engine 140 may implement a set of renaming rules for disambiguating classes and libraries based on versions. The method 400 then proceeds directly to step 416.

If, however, at step 410, the shading engine 140 determines that the current library 160(*i*) is included in the transitive dependencies 225 of the application code 125, then the method 400 proceeds directly to step 414. At step 414, the shading engine 140 renames the current library 160(*i*) based on the version associated with the current library 160(*i*) and shades all the classes 180 included in the renamed current library 160(*i*) to create the shaded classes 340. The shading engine 140 may shade the classes 180 in any technically feasible fashion that deterministically produces shaded classes 340 that are disambiguated from the classes 180 included in other versions of the current library 160(*i*).

For example, in some embodiments, the shading engine 140 may rename the packages that include the classes 180 to names that include the version associated with the current library 160(*i*). As a result of such a "package relocation" process, because the fully qualified name of each of the classes 180 includes the name of the associated package, the package relocated classes 180 are uniquely identified. Accordingly, the package relocated classes 180 are referred to herein as the shaded classes 340.

At step 416, the shading engine 140 determines whether the current library 160(*i*) depends on any of the other libraries 160 based on the dependency descriptor 190(*i*) associated with the current library 160(*i*). If, at step 416, the shading engine 140 determines that the current library 160(*i*) does not depend on any of the other libraries 160, then the method 400 proceeds to step 417. At step 417, the shading engine 140 returns the current library 160(*i*) and the associated dependency descriptor 190(*i*) to the requester. The requester may be either the build tool 130 or the shading engine 140. The method 400 then terminates.

If, however, at step 416, the shading engine 140 determines that the current library 160(*i*) depends on one or more of the other libraries 160, then the method 400 proceeds directly to step 418. At step 418, for each of the libraries 160 that is included in the dependency descriptor 190(*i*) associated with the current library 160(*i*), the shading engine 140 recursively calls the shading engine 140. More precisely, the shading engine 140 repeatedly re-executes the method 400 to retrieve and selectively shade the libraries 160 that are included in the dependency descriptor 190(*i*). Notably, as persons skilled in the art will recognize, as part of executing the step 418 at a particular recursion level, the shading engine 140 recursively re-executes the method 400 at a lower recursion level. In this fashion, the shading engine 140 traverses the dependency tree 210 in a depth-first manner.

At step 420, the shading engine 140 updates the current library 160(*i*) to refer to the shaded classes 340 that are included in the dependencies of the current library 160(*i*). More specifically, for each such shaded class 340, the shading engine 140 searches the current library 160(*i*) for references to the corresponding ambiguous class 180. The shading engine 140 then replaces the identified references to the corresponding ambiguous class 180 with references to the differentiated shaded class 340. Notably, at step 420, if the current library 160(*i*) is included in the transitive dependencies 225 of the application code 125, then the name of the current library 160(*i*) specifies the current version as detailed in the description of step 414.

By contrast, if the current library 160(*i*) is included in the first-order dependencies 225 of the application code 125, then name of the current library 160(*i*) matches the name of the current library 160(*i*) in the dependency descriptor 190 associated with the application code 125. In this fashion, the shading engine 140 differentiates between multiple versions of all the dependencies of the application code 125 while maintaining a consistent interface between application code 125 and the first-order dependencies 215 of the application code 125.

At step 422, the shading engine 140 modifies the dependency descriptor 190(i) associated with the current library 160(i) to specify the differentiated names of the libraries 160 included in the first-order dependencies 215 of the current library 160(i). As a general matter, the dependency descriptor 190(i) associated with the library 160(i) specifies the libraries 160 that are included in the first-order dependencies 215 of the library 160(i). The dependency descriptor 190(i) does not specify the libraries 160 that are included the transitive dependencies 225 of the library 160(i). Accordingly, for each of the libraries 160(x) that is included in the first-order dependencies 215 of the current library 160(i), the shading engine 140 replaces the ambiguous previous name of the library 160(x) with the disambiguated current name of the library 160(x).

As part of step 422, if the current library 160(i) is not included in the first-order dependencies 225 of the application code 125, then the shading engine 140 further modifies the dependency descriptor 190(i) to reflect the disambiguated name of the current library 160(i). At step 424, the shading engine 140 returns the current library 160(i) and the associated dependency descriptor 190(i) to the requester. The requester may be either the build tool 130 or the shading engine 140. Advantageously, because the dependency descriptor 190(i) references the differentiated libraries 160, the build tool 130 is automatically configured to proceed with the software build using the disambiguated libraries 160. The method 400 then terminates.

In sum, the disclosed techniques may be used to dynamically eliminate dependency conflicts during the software build process for application code. The shading engine acts as a reverse proxy for a software artifact repository. During the build process, as the build tool requests libraries, the shading engine retrieves the appropriate version of the library and the corresponding dependency descriptor from the software artifact depository. The shading engine then selectively "shades" transitive dependencies of the application code and returns the requested library and the dependency descriptor. More specifically, beginning with the requested library, the shading engine recursively traverses the libraries included in the hierarchical dependency tree associated with the requested library. The shading engine systematically renames each library that is a not a first-level dependency of the application code based on the version of the library. Such dependencies are commonly referred to as transitive dependencies. In a complementary fashion, the shading engine updates the dependency descriptors of the requested library to refer to the renamed libraries.

Within each renamed library that is a transitive dependency of the application code, the shading engine package relocates the classes. The package relocation process effectively renames and disambiguates the classes from other transitive dependencies and the first-order dependencies of the application code. Further, the shading engine modifies the library dependencies of the application code to reference the disambiguated classes instead of the classes. Notably, because the shading engine does not modify the names of first-level dependencies of the application code, the application code is not affected. The shading engine may also address any number of special case scenarios to complete the disambiguation process. For example, the shading engine may inject binary code into a first-order library dependency of the application code to indirectly shade a transitive class dependency included in a seam between the application code and the library dependency.

Advantageously, the just-in-time shading techniques described herein enable multiple versions of software libraries to co-exist in an executable application specified by application code that is written in a programming language that implements a sequential dependency list. By contrast, to comply with such a sequential dependency list restriction, conventional approaches to dependency conflict management that involve locking versions include a "locked" version of each software library in the executable. Further, because the shading engine automatically shades the dependencies without manual intervention, the time required to manage dependency conflicts and the likelihood of errors is significantly less than conventional manually-based dependency conflict management techniques.

1. In some embodiments, a method comprises determining that a first library is a dependency of a second library; retrieving the first library from a binary software repository stored in a memory; renaming a first set of one or more classes included in the first library to generate a first disambiguated library that includes a second set of one or more disambiguated classes; searching the second library, via a processor, for references to the first set of one or more classes; and replacing the references to the first set of one or more classes with references to the second set of one or more disambiguated classes to generate a second disambiguated library.

2. The method of clause 1, wherein renaming a first class included in the first set comprises relocating a first package that includes the first class to produce a first disambiguated package.

3. The method of clauses 1 or 2, further comprising renaming the first disambiguated library and replacing a reference to the first library that is included in a dependency descriptor with a reference to the first disambiguated library, wherein the dependency descriptor is associated with the second library.

4. The method of any of clauses 1-3, further comprising determining that the second library comprises a transitive dependency of a software application; renaming the second library to generate a second disambiguated library; and renaming the dependency descriptor to generate a disambiguated dependency descriptor that is associated with the second disambiguated library.

5. The method of any of clauses 1-4, further comprising determining that a seam between a software application and the second library includes a reference to a first class included in the first set, wherein the first class comprises a transitive dependency of the software application; and inserting binary code into the second library that generates a first instance of a first disambiguated class included in the second set and copies data included in a second instance of the first class to the first instance.

6. The method of any of clauses 1-5, further comprising receiving a request from a software build tool to retrieve the first library and, in response, transmitting the first disambiguated library to the software build tool.

7. The method of any of clauses 1-6, wherein the memory is included within a server machine.

8. The method of any of clauses 1-7, wherein the first library is a transitive dependency of a software application that is written in a programming language that implements a sequential dependency list.

9. The method of any of clauses 1-8, further comprising transmitting the second disambiguated library to a software build tool.

10. In some embodiments, a computer-implemented computer-readable storage medium includes instructions that, when executed by a processor, cause the processor to perform the steps of retrieving a first library and a dependency descriptor that is associated with the first library from a binary software repository; determining that a second library is a dependency of the first library based on the first dependency descriptor; retrieving the second library from the binary software repository; performing a first set of disambiguation operations on the second library to generate a second disambiguated library; and performing a second set of disambiguation operations on the first library based on the first set of disambiguation operations to generate a first disambiguated library.

11. The computer-readable storage medium of clause 10, wherein the first set of disambiguation operations includes renaming a first class included in the second library to generate a first disambiguated class.

12. The computer-readable storage medium of clauses 10 or 11, wherein the second set of disambiguation operations includes replacing a reference to the first class with a reference to the first disambiguated class.

13. The computer-readable storage medium of any of clauses 10-12, further comprising determining that a seam between a software application and the first library includes a reference to the first class; and inserting binary code into the first library that generates a first instance of the first disambiguated class and copies data included in a second instance of the first class to the first instance.

14. The computer-readable storage medium of any of clauses 10-13, wherein the first set of disambiguation operations includes renaming the second disambiguated library and further comprising replacing a reference to the second library that is included in the dependency descriptor with a reference to the second disambiguated library.

15. The computer-readable storage medium of any of clauses 10-14, further comprising transmitting the first disambiguated library to a software build tool.

16. The computer-readable storage medium of any of clauses 10-15, wherein the second library is a transitive dependency of a software application that is written in a programming language that implements a sequential dependency list.

17. The computer-readable storage medium of any of clauses 10-16 wherein the programming language comprises the Java programming language.

18. In some embodiments, a system comprises a memory storing a shading engine; and a processor that is coupled to the memory and, when executing the shading engine, is configured to receive a request for a first library from a software build tool; determine that a second library is a dependency of the first library, modify the second library to generate a second disambiguated library, modify the first library based on the second disambiguated library to generate a first disambiguated library, and transmit the first disambiguated library to the software build tool.

19: The system of clause 18 wherein the shading engine configures the processor to modify the second library by renaming the second library and one or more classes included in the second library.

20. The system of clauses 18 or 19, wherein the second library is a transitive dependency of a software application that is written in a programming language that implements a sequential dependency list.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. A computer-implemented method, comprising:
   determining that a first library is a dependency of a second library;
   retrieving the first library from a binary software repository stored in a memory;
   renaming a first set of one or more classes included in the first library to generate a first disambiguated library that includes a second set of one or more disambiguated classes;
   searching the second library, via a processor, for references to the first set of one or more classes; and
   replacing the references to the first set of one or more classes with references to the second set of one or more disambiguated classes to generate a second disambiguated library.

2. The method of claim 1, wherein renaming a first class included in the first set comprises relocating a first package that includes the first class to produce a first disambiguated package.

3. The method of claim 1, further comprising renaming the first disambiguated library and replacing a reference to the first library that is included in a dependency descriptor with a reference to the first disambiguated library, wherein the dependency descriptor is associated with the second library.

4. The method of claim 3, further comprising:
   determining that the second library comprises a transitive dependency of a software application;
   renaming the second library to generate a second disambiguated library; and
   renaming the dependency descriptor to generate a disambiguated dependency descriptor that is associated with the second disambiguated library.

5. The method of claim 1, further comprising:
   determining that a seam between a software application and the second library includes a reference to a first class included in the first set, wherein the first class comprises a transitive dependency of the software application; and
   inserting binary code into the second library that generates a first instance of a first disambiguated class included in the second set and copies data included in a second instance of the first class to the first instance.

6. The method of claim 1, further comprising receiving a request from a software build tool to retrieve the first library and, in response, transmitting the first disambiguated library to the software build tool.

7. The method of claim 1, wherein the memory is included within a server machine.

8. The method of claim 1, wherein the first library is a transitive dependency of a software application that is written in a programming language that implements a sequential dependency list.

9. The method of claim 1, further comprising transmitting the second disambiguated library to a software build tool.

10. A non-transitory computer-readable storage medium including instructions that, when executed by a processor, cause the processor to perform the steps of:
    retrieving a first library and a dependency descriptor that is associated with the first library from a binary software repository;
    determining that a second library is a dependency of the first library based on the first dependency descriptor;
    retrieving the second library from the binary software repository;
    performing a first set of disambiguation operations on the second library to generate a second disambiguated library; and
    performing a second set of disambiguation operations on the first library based on the first set of disambiguation operations to generate a first disambiguated library.

11. The non-transitory computer-readable storage medium of claim 10, wherein the first set of disambiguation operations includes renaming a first class included in the second library to generate a first disambiguated class.

12. The non-transitory computer-readable storage medium of claim 11, wherein the second set of disambiguation operations includes replacing a reference to the first class with a reference to the first disambiguated class.

13. The non-transitory computer-readable storage medium of claim 11, further comprising:
    determining that a seam between a software application and the first library includes a reference to the first class; and
    inserting binary code into the first library that generates a first instance of the first disambiguated class and copies data included in a second instance of the first class to the first instance.

14. The non-transitory computer-readable storage medium of claim 10, wherein the first set of disambiguation operations includes renaming the second disambiguated library and further comprising replacing a reference to the second library that is included in the dependency descriptor with a reference to the second disambiguated library.

15. The non-transitory computer-readable storage medium of claim 10, further comprising transmitting the first disambiguated library to a software build tool.

16. The non-transitory computer-readable storage medium of claim 10, wherein the second library is a transitive dependency of a software application that is written in a programming language that implements a sequential dependency list.

17. The non-transitory computer-readable storage medium of claim 16 wherein the programming language comprises the Java programming language.

18. A system, comprising:
    a memory storing a shading engine; and
    a processor that is coupled to the memory and, when executing the shading engine, is configured to:
        receive a request for a first library from a software build tool,
        determine that a second library is a dependency of the first library,
        modify the second library to generate a second disambiguated library, modify the first library based on the second disambiguated library to generate a first disambiguated library, and transmit the first disambiguated library to the software build tool.

19. The system of claim 18 wherein the shading engine configures the processor to modify the second library by renaming the second library and one or more classes included in the second library.

20. The system of claim 18, wherein the second library is a transitive dependency of a software application that is written in a programming language that implements a sequential dependency list.

* * * * *